United States Patent
Squyres

(10) Patent No.: US 7,418,419 B2
(45) Date of Patent: *Aug. 26, 2008

(54) METHOD AND SYSTEM FOR COMPARISON AND EVALUATION OF INVESTMENT PORTFOLIOS

(75) Inventor: James G. Squyres, Darien, CT (US)

(73) Assignee: Buyside Research LLC, Darien, CT (US)

(*) Notice: Subject to any disclaimer, the term of this patent is extended or adjusted under 35 U.S.C. 154(b) by 583 days.

This patent is subject to a terminal disclaimer.

(21) Appl. No.: 11/025,877

(22) Filed: Dec. 29, 2004

(65) Prior Publication Data

US 2005/0171886 A1    Aug. 4, 2005

Related U.S. Application Data

(63) Continuation-in-part of application No. 09/900,724, filed on Jul. 6, 2001, now Pat. No. 7,222,095.

(51) Int. Cl.
G06Q 40/00 (2006.01)
(52) U.S. Cl. .................... 705/36 R; 705/35
(58) Field of Classification Search ............ 705/35, 705/36 R
See application file for complete search history.

(56) References Cited

U.S. PATENT DOCUMENTS

| | | | |
|---|---|---|---|
| 5,270,922 A | 12/1993 | Higgins | |
| 5,414,838 A | 5/1995 | Kolton et al. | |
| 5,590,325 A | 12/1996 | Kolton et al. | |
| 5,689,651 A | 11/1997 | Lozman | |
| 5,819,238 A | 10/1998 | Fernholz | |
| 5,880,726 A | 3/1999 | Takiguchi et al. | |
| 5,893,079 A | 4/1999 | Cwenar | |
| 5,913,202 A | 6/1999 | Motoyama | |
| 5,930,774 A | 7/1999 | Chennault | |
| 5,946,666 A | 8/1999 | Nevo et al. | |
| 5,983,203 A | 11/1999 | Church et al. | |
| 6,012,042 A * | 1/2000 | Black et al. | 705/36 R |
| 6,021,397 A | 2/2000 | Jones et al. | |
| 6,049,783 A | 4/2000 | Segal et al. | |
| 6,122,635 A | 9/2000 | Burakoff et al. | |
| 6,175,824 B1 | 1/2001 | Bretizman et al. | |
| 6,195,647 B1 | 2/2001 | Martyn et al. | |
| 6,850,897 B2 | 2/2005 | Paquette | |
| 6,976,000 B1 | 12/2005 | Manganaris et al. | |
| 7,222,095 B2 * | 5/2007 | Squyres | 705/36 R |
| 2002/0184131 A1 * | 12/2002 | Gatto | 705/36 |

OTHER PUBLICATIONS

Vertex Interactive Chosen Among Top 100 Leading Edge Supply Chain Vendors by Supply Chain e-Business. Business Wire. New York; Jun. 27, 2001. (3 pages).*

* cited by examiner

Primary Examiner—Kambiz Abdi
Assistant Examiner—Jennifer Liversedge
(74) Attorney, Agent, or Firm—Kramer, Levin, Naftalis & Frankel LLP

(57) ABSTRACT

A method and system performs an analysis to compare and evaluate the performance of an investment portfolio. The method and system includes fiscal data realignment and multiple holdings date evaluations for fundamental financial analyses for each stock in the investment portfolio. The fundamental financial analysis can include a negative base number inclusion process and uses financial data for the stocks selected from comparable weighted time periods, each weighted time period including holdings of the investment portfolio as of each time period, thereby generating a more accurate evaluation of the investment portfolio.

23 Claims, 6 Drawing Sheets

| STOCK | VALUE ($000,000) | WEIGHT | QTR END | QTR 1 | QTR 1-4 | RATE | WT X QTR 1 | WT X QTR 1-4 |
|---|---|---|---|---|---|---|---|---|
| a — GENERAL ELECTRIC COMPANY | 620,881 | 0.11794 | 3/31/01 | 0.30 | 0.26 | 15.00 | 0.03538 | 0.03057 |
| b — TYCO INTL. LTD. (NEW) | 607,963 | 0.00000 | ***** | ***** | ***** | ***** | n/a | n/a |
| c — CISCO SYSTEMS, INC. | 569,653 | 0.10218 | 1/27/01 | n/a | 0.10 | n/a | 0.00000 | 0.00000 |
| d — INTEL CORPORATION | 537,912 | 0.00000 | 3/31/01 | 0.07 | 0.40 | -83.00 | 0.00715 | 0.04087 |
| e — VIACOM, INC. | 494,344 | 0.00000 | 12/31/00 | n/a | 0.10 | n/a | 0.00000 | 0.00000 |
| f — PFIZER INC. | 414,908 | 0.07394 | 3/31/01 | 0.46 | -0.03 | n/a | 0.00000 | 0.00000 |
| g — MICROSOFT CORPORATION | 389,247 | 0.00000 | 3/31/01 | 0.46 | 0.45 | 0.00 | 0.03401 | 0.03401 |
| h — CITIGROUP INC. | 379,309 | 0.00000 | 12/31/00 | n/a | 0.80 | n/a | 0.00000 | 0.00000 |
| i — EXXON MOBIL CORPORATION | 220,224 | 0.00000 | 12/31/00 | n/a | 0.87 | n/a | 0.00000 | 0.00000 |
| . | . | . | . | . | . | . | . | . |
| j — VERITAS SOFTWARE CORP. | 174,813 | 0.03321 | 3/31/01 | -0.40 | -0.44 | -9.10 | -0.01328 | -0.01461 |
| . | . | . | . | . | . | . | . | . |
| k — SPRINT PCS GROUP | 135,114 | 0.02567 | 3/31/01 | -0.41 | -0.54 | -24.00 | -0.01052 | -0.01386 |
| l — ROYAL DUTCH PETROLEUM CO. | 134,033 | 0.00000 | ***** | ***** | ***** | ***** | n/a | n/a |
| m — APPLE COMPUTER, INC. | 133,586 | 0.02538 | 3/31/01 | 0.12 | 0.72 | -83.00 | 0.00305 | 0.01827 |
| n — BANK OF NEW YORK CO. | 29,248 | 0.00555 | 3/31/01 | 0.53 | 0.46 | 15.00 | 0.00294 | 0.00256 |
| o — JUNIPER NETWORKS, INC. | 26,921 | 0.00511 | 3/31/01 | 0.19 | 0.03 | 533.00 | 0.00097 | 0.00015 |
| p — ZIONS BANCORPORATION | 26,324 | 0.00500 | 3/31/01 | 0.82 | -0.33 | n/m | 0.00410 | -0.00165 |
| q — ALLTEL CORPORATION | 21,698 | 0.00412 | 3/31/01 | 1.20 | 0.69 | 74.00 | 0.00495 | 0.00284 |
| r — TYCOM LTD. | 11,813 | | ***** | ***** | ***** | ***** | n/a | n/a |
| | 14,531,757 | 1.00000 | | | | | 0.13450 | 0.30190 |
| | 5,264,275 | | | | | | | -55.4 |

FIG. 2

Based on 2,741 funds holdings from 01/01/2003 to
12/31/2003, funds with stocks in the highest quartile
of 1-year EPS growth ranged from 3,593.4% to 113.8%.
The average EPS growth rate for funds in this
quartile was 262.6%.

Highest quartile (3,593.1 - 113.8, AVG = 262.6)
2nd highest quartile (113.8 - 72.0, AVG = 89.0)
3rd highest quartile (72.0 - 39.4, AVG = 55.9)
Lowest quartile (39.1 - -90.0, AVG = 13.8)
AVG 2741 funds (105.4)

FIGURE 4A

```
Based on 3,260 funds holdings from 01/01/2003 to
12/31/2003, funds with stocks in the highest quartile of
1-year sales growth ranged from 113.5% to 14.2%. The
average sales growth rate for funds in this quartile was
22.0%.

Highest quartile (113.5 - 14.2, AVG = 22.0)
2nd highest quartile (14.2 - 10.3, AVG = 12.0)
3rd highest quartile (10.3 - 8.3, AVG = 9.2)
Lowest quartile (8.3 - -57.6, AVG = 5.1)
AVG 3260 funds (12.1)
```

FIGURE 4B

```
2,741 funds in the quartiles above for both EPS and sales can be assigned
to the quadrants below.

Average values for EPS and SLS are indicated.  For example, funds in
quadrant #1 (the highest two quartiles of EPS and sales growth above), owned stocks with an average
1-year EPS growth of 192.1% and sales growth of 16.9%.
```

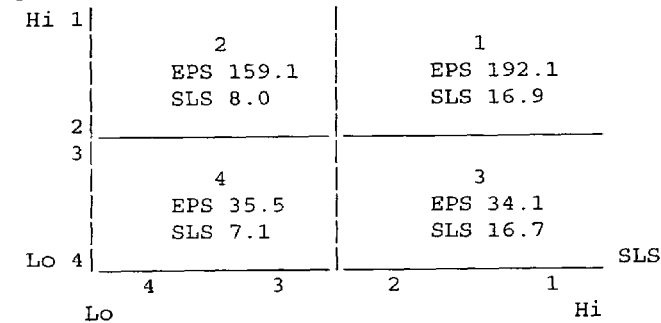

```
697 funds in quadrant #1 (top 2 quartiles of EPS & SLS).
   (174 funds in 1st quartiles of both EPS & SLS.)
674 funds in quadrant #2 (top 2 EPS & bottom 2 SLS quartiles).
644 funds in quadrant #3 (top 2 SLS & bottom 2 EPS quartiles).
726 funds in quadrant #4 (bottom 2 quartiles of EPS & SLS).
   (228 funds in 4th quartiles of both EPS & SLS.)
```

METHOD AND SYSTEM FOR COMPARISON AND EVALUATION OF INVESTMENT PORTFOLIOS

CROSS REFERENCE TO RELATED APPLICATIONS

This application is a continuation-in-part of copending application Ser. No. 09/900,724, filed on Jul. 6, 2001 now U.S. Pat. No. 7,222,095 and which is hereby incorporated by reference in its entirety.

FIELD OF THE INVENTION

The present invention relates to a method and system for comparing and evaluating investment portfolios. More particularly, the present invention relates to a method and system for evaluating the performance of investment portfolios, such as pension funds, profit sharing funds or mutual funds, of securities such as common stocks or corporate bonds, based on fundamental performance measures commonly applied to individual securities, such as using data from financial statements such as 10-Ks and 10-Qs.

BACKGROUND INFORMATION

Fundamental analysis of a company's financial statements is a methodology used to analyze the performance of securities, especially stock. Financial data made available in company disclosures generally serve as the basis for the fundamental analysis. For example, these financial data can be extracted from financial statements such as 10-Ks and 10-Qs. These statements are reported based on fiscal years and fiscal quarters. The financial data can be entered into various formulae in order to gauge the performance of a company's underlying business. Fundamental analysis uses data from these financial statements to measure growth, profitability, capital structure and valuation. Examples of fundamental measures are: earnings/sales growth rates; return on equity; debt:equity ratios; PE ratios.

Stock databases containing the financial data are commercially available. The financial data associated with a specific company are usually referenced by a CUSIP number. CUSIP numbers, operated by Standard & Poor's for the American Bankers Association, establish a standardized system for identifying financial instruments, for example, the stock of all registered U.S. and Canadian companies and U.S. government and municipal bonds.

Not until recently were databases that identify all of the stocks of a mutual fund by CUSIP number made commercially available. The CUSIP number allows the financial data in a stock database to be associated with the respective stock in a mutual fund in a fund database.

As with individual securities, analytic methods can be used to measure the overall performance of a mutual fund or other financial portfolio. Traditional analyses of mutual funds which measure performance are based upon price changes and volatility. For example, with respect to the analyses of mutual funds, references to total return represent a fund's gains over a specified period of time. Total return includes both income (in the form of dividends or interest payments) and capital gains or losses (the increase or decrease in the value of a security). Commercial providers of investment information, for example Morningstar, Inc. of Chicago, Ill., calculate total return by taking the change in a fund's net asset value, assuming the reinvestment of all income and capital-gains distributions (on the actual reinvestment date used by the fund) during the period, and then dividing by the initial net asset value.

Unless marked as load-adjusted total returns, conventional commercial analyses of mutual funds do not adjust total return for sales charges or for redemption fees. (e.g., Morningstar Return, Morningstar Risk-Adjusted Ratings, and the load-adjusted returns do incorporate those fees.) Total returns do account for management, administrative, and 12b-1 fees and other costs automatically deducted from fund assets.

These conventional mutual fund analyses do not, however, use methods that resemble the fundamental analysis techniques used in fundamental equity analysis. For example, there are analyses of mutual funds which measure performance based on price changes and volatility measures. There also are analyses which list the top ten (or some other small number) stocks (as measured by market value). Yet other mutual fund analyses measure industry or sector overlap among funds (e.g., the percent in technology in find A versus the percent in technology in fund B). There also are systems which compare the securities in investment portfolios to determine overlap. However, these performance measurements of mutual funds do not accurately reflect the overall or cumulative fundamental analyses of the individual stocks of the portfolio.

Thus, there is a need for a system and method that evaluates the performance of a mutual fund, or other investment portfolio, that uses comparable and complete fundamental data based on the individual stocks within the portfolio. In addition, there is a need for a system and method that evaluates the performance of an investment portfolio using the actual holding of the portfolio, such as are reported on each holdings date of the portfolio.

Buyside Research of Darien, Connecticut has developed a computer program (referred to herein as the "Stock System") including text and screen displays which graphically compare the performance of one company with its six closest competitors using fundamental financial data. In June of 1999, these graphic comparisons became commercially available over the Multex system, now owned and operated for Reuters, which distributed "Wall Street" research to more than two million users. The present invention combines unique processes of this Stock System with other unique processes in order to aggregate the stock measures for mutual funds or investment portfolios.

Because financial measures and aggregate financial measures of companies are being compared, special processes must be employed to insure that these comparisons are made over similar time periods and are as inclusive as possible. The present invention features unique processes to improve comparability and inclusiveness.

SUMMARY OF THE INVENTION

According to an exemplary embodiment of the present invention, a method and system are provided wherein a fundamental analysis is performed on the stocks in a financial portfolio, such as a mutual fund or pension fund, to measure the performance of the portfolio. First, the data used to perform the analysis are extracted from a securities (e.g., stock) database that contains information from, for example, company disclosures. A first comparison process filters out any financial data from companies that are not approximately one year in length. Thus, the present invention avoids comparing companies in a portfolio that lack data for the full fiscal period desired for evaluation. For example, a company which begins reporting in September 2003 will not have 12 months of earnings as of December 2003; thus its data for 2003 annual comparisons would be excluded. A second comparison process is then executed to convert the data for any fiscal quarter/year period into a comparable calendar quarter/year period. Once these two processes (collectively, "fiscal realignment") are completed, "fundamental measures" for each company are calculated based on formulae commonly used throughout the investment community.

Fundamental analysis uses data from these financial statements to measure growth, profitability, capital structure and valuation for the holdings in a portfolio. Examples of fundamental measures are: earnings/sales growth rates; return on equity; debt:equity ratios; and PE ratios and other measures. The fundamental measures used in the present invention use rates and ratios derived from two values ("base values"): a beginning value and an ending value (in the case of compound annual growth rates); or a numerator and denominator (in the case of quarter-to-quarter earnings percent changes). Since there is a possibility that one of these base values can be negative, the present invention uniquely uses these two base values, rather than a derived rate or ratio, to attain "negative base number inclusions."

Each week, new data are provided for the securities database and the funds database to update underlying financial data and fund holdings. Fund data are lists of the most recent information about mutual funds and their stocks; there are, for example, approximately four thousand equity mutual funds for which information is available. The holdings of a mutual fund can be associated with the underlying financial data for each holding using, for example, the CUSIP number, now available in stock and fund databases. The CUSIP number used in both databases provides the link between the databases.

Weights for each stock in each portfolio can be calculated based on the market value of that stock divided by the total market value of the stocks in each portfolio (e.g., the market value of any one stock is divided by the market value of all stocks). Since there is a possibility that one of the base numbers can be negative, the weights are multiplied by the base numbers (e.g., from the stock database) of each stock that have been subject to fiscal realignment. Summing the products of these multiplications allows for negative base number inclusion and aggregated values for the fundamental measures. For example, when a fund's holdings are measured for two or more holdings dates, the portfolio's base numbers for each holdings date are used in a rate/ratio calculation. That rate/ratio calculation is weighted by the time period related to the holdings date and averaged; if an aggregate base number for a portfolio on a holdings date is negative, results for all holdings periods for that portfolio are excluded. Any fundamental measure listed in Table 1 below, or any other variable similar to that found in on a Compustat-like database can be aggregated. For example, an aggregate EPS growth rate can be produced for an investment portfolio.

As explained in the co-pending application, fundamental analysis comparing stocks is based on specific time periods; for example, earnings growth for chemical companies may be compared for 2004. Comparisons would be inaccurate if the 2003 earnings of some companies were compared to 2004 earnings of other companies. So too, portfolio aggregates (based on the stocks in a portfolio) must be based on comparable time periods. By applying fiscal realignment, the present invention provides at least partial time period comparability (e.g., at least two out of three months in a quarter or six out of twelve months in a year).

Accordingly, the first comparison process applies strict time period inclusions. For example, if a portfolio comparison specifies an earnings comparison of portfolios for 2004 and if a company has not yet reported December 2004 earnings, the time comparison process according to exemplary embodiments of the present invention identifies companies that lack data for the desired time period and excludes such companies from the analysis. This is in contrast to, for example, the trailing-twelve-month convention employed throughout the industry. Thus, the prior art trailing-twelve-month methodology would substitute 12-month earnings through Sep. 30, 2004 or, if those data were not yet reported, 12-month earnings through Jun. 30, 2004. The present invention, in contrast to the trailing-twelve-month convention, provides the same time period comparability for stock portfolios that is necessary for comparisons of stocks.

With these aggregate fundamental measures, portfolio performance can be measured using the same fundamental benchmarks which are widely employed for common stock analyses.

Measures deemed essential for fundamental analysis of one stock are presumed to be at least as valid for a group of stocks. By employing fiscal realignment, including strict time period inclusion provided by the first comparison process, the system and method according to an embodiment of the present invention provide results which are more comparable than any other portfolio aggregates which exist today. By employing the unique negative base number inclusions process, the results are far more inclusive than any other existing evaluation approaches.

The present invention uniquely provides two approaches to fund analysis: (1) with a primary focus on a specific corporate fiscal reporting period comparisons (e.g. 2003 EPS vs. 2002 EPS) as described in the co-pending application; and (2)with multi-holding dates comparisons (e.g., fund holdings from a desired evaluation period—mm/dd/yyyy through mm/dd/yyyy—are compared using data for the holdings of the fund as of each holdings reporting date and weighted appropriately).

Multi-period comparisons are, for example, comparisons that include more than one holdings date (holdings dates are those dates on which a portfolio's investment are reported). For example, to compare the one-year sales growth of stocks in a group of portfolios based on their holdings from Dec. 31, 2001 through Dec. 31, 2003, each portfolio may have reported its holdings more than once during a year. (Indeed, the SEC recently changed the required reporting frequency of mutual funds from a minimum of twice a year to a minimum of 4 times a year.)

The present invention creates a weighting factor for calculations of portfolio aggregates which include multiple holding reporting periods. As an example, one-year sales growth rate may be of interest over a two year period for two portfolios. Portfolio #1 may have reported holdings on Jun. 30, 2002, Dec. 31, 2002, Mar. 31, 2003, Jun. 30, 2003, Sep. 30, 2003 and Dec. 31, 2003. Portfolio #2 may have reported semiannually for both years.

Using the above example, the system and method according to an exemplary embodiment of the present invention determines the total number of months involved with the evaluation period (which can be a predetermined evaluation period selected by a user). In this example, a 24-month evaluation period was selected. An aggregate 1-year sales growth rate then is calculated for the stocks in each portfolio as of each portfolio's holdings report dates. The aggregate growth rate is weighted by the number of months attributable to each reporting date. Thus, to determine the average 1-year sales growth rate of Portfolio #1's holdings on six report dates over a 2-year period, the calculation would be:

Total months=ending date (requested by the investor)—starting date (requested by the investor).

Aggregate 1-year sales growth rate on Jun. 30, 2002 X $1^{st}$ report date's weighting factor Plus Aggregate 1-year sales growth rate on Dec. 31, 2002 X $2^{nd}$ report date's weighting factor Plus Aggregate 1-year sales growth rate on Mar. 31, 2003 X $3^{rd}$ report date's weighting factor etc.

In this case, the respective weighting factors would be: 6 mos./24 mos. (for the $1^{st}$ report date), 6 mos./24 mos. (for the $2^{nd}$ report date) and 3 mos./24 mos. (for each of the 4 reporting dates in 2003). An unweighted average of 6 reporting dates would arithmetically emphasize the four 2003 rates vs. the two 2002 rates. By weighting with each report date's coverage period, the two years are given appropriate proportions in the multi-report date time frame. The weighting factors for each of Portfolio #2's four 1-year sales aggregates would be 6 mos./24 mos. (or ¼).

Additional objects and advantages of the present invention will be set forth in the description which follows. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate an exemplary embodiment of the present invention.

FIG. 2 illustrates an exemplary analysis of an investment portfolio according to an embodiment of the present invention.

FIGS. 4a-4c illustrate an exemplary ranking and grouping of equity funds according to an exemplary embodiment of the present invention.

DETAILED DESCRIPTION

Figure 1:
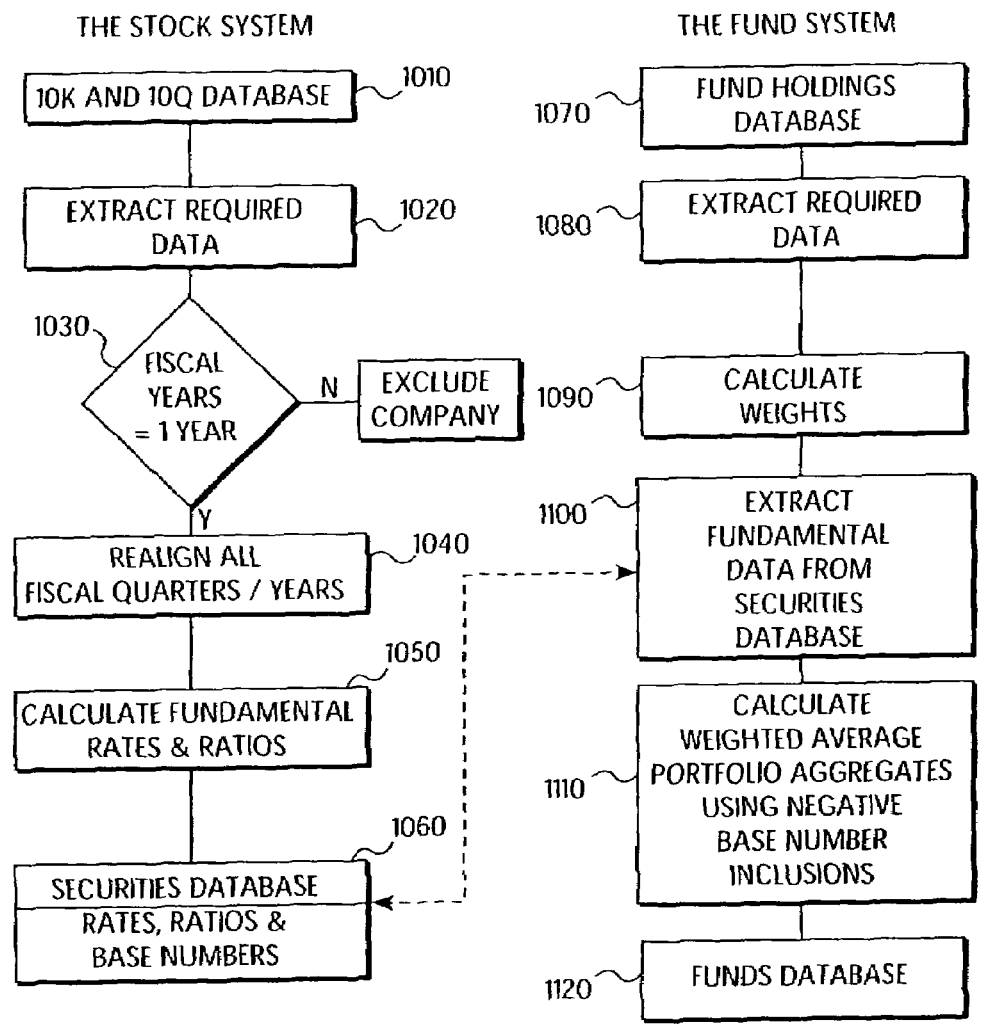
FIG. 1 illustrates an exemplary series of operations performed by computer software for evaluating an investment portfolio according to an exemplary embodiment of the present invention.

FIG. 1 illustrates an exemplary method for transforming data from stock portfolios or mutual funds into a format suitable for fundamental analyses according to an exemplary embodiment of the present invention.

For example, the process starts when the Stock System creates a securities database for the Fund System. For the purposes of discussion herein, processing of the underlying financial data for a company is referred to as being performed by a "Stock System" and the use of the processed data to evaluate a portfolio (e.g., a collection of stocks) is referred to as being performed by a "Fund System." It should be understood that the Stock System and the Fund System can be implemented as separate systems (e.g., separate computer systems) or can be separate processes carried out by a particular computer system.

The Stock System accesses a suitable commercially available database containing the desired underlying financial data. For example, at 1010 the process begins with accessing a commercially available database of information from 10-Ks and 10-Qs. Examples of these databases are Standard and Poor's Compustat and Market Guide's Investment Manager. At 1020, the desired financial information can be extracted from company disclosures such as balance sheets, income statements, and cash flow statements contained in the database. Specific data taken from a balance sheet (and stored in the financial data database) can include, but are not limited to, liquid assets, investments, inventories, fixed assets, intangible assets, short-term liabilities, long-term debt, and leases. Specific data taken from an income statement can include, but are not limited to, sales, expenses, and net income. Specific data taken from a cash flow statement can include, but are not limited to, cash receipts and cash payments.

At 1020, the relevant data for each company are extracted from the database. In an exemplary embodiment, the data for all companies in the database are used while in alternative embodiments, the data for only particular companies of interest can be used. For example, weekly batch processing of financial data for numerous companies can be performed or real-time processing of financial data for particular companies can be performed based on the needs or desires of the user.

The extracted financial data form base numbers used to derive fundamental investment measures; for example, the extracted data could include earnings per share ("EPS") for every quarter/year and assets for every quarter-end/year-end. The data for each company are identified within the database using a unique CUSIP number as is known in the art. The database at 1010 contains, for example, historical quarterly/annual data dating back ten years or more. As is known in the art, these commercially available financial databases are updated daily or weekly and include the financial histories for more than ten thousand companies.

At 1030, the first part of the fiscal realignment process according to an embodiment of the present invention is initiated on the data set accessed or extracted from the financial database. The purpose of this first comparison process is, for example, to eliminate companies that do not have comparable lengths of time in their fiscal years. For example, a company may not have enough historical financial information for a particular time period, such as five years or one year, because of mergers or divestitures, or the company may not have been in existence for the desired time period.

Maximum and minimum limits should be established for the fiscal years to provide a meaningful financial analysis. If, for example, a company with a December fiscal year-end begins business in June, its first year of business will be a six month period—not a twelve month period. To compare that company's sales with another company which was in business for the entire twelve month period of that year would be inappropriate. Because companies are compared over a number of different time periods, such as five years, yearly or quarterly, the analysis should proceed with the time periods being similar. The maximum limit for a fiscal year has been set at, for example, thirteen months or fifty-four weeks, and the minimum limit for a fiscal year has been set at, for example, eleven months or fifty weeks. Hence, for fundamental measures over a five year period, data for companies which exceed the maximum or minimum are excluded from the securities database. Small adjustments can be made to these maximum and minimum limits as desired.

At 1040, the second part of the fiscal realignment process is initiated. The second comparability process serves to, for example, convert all fiscal years and quarters into comparable calendar years and quarters to improve the accuracy of the analysis. The analysis may make comparisons for, for example, a five year, annual, year-to-date or quarterly period.

Two steps are used to complete the second part of the fiscal realignment process: (1) derive a calendar-based date of the fiscal year/quarter and (2) realign the fiscal period into comparable calendar periods.

Step 1: Deriving a calendar-based date of the fiscal year/quarter

If the last day of the fiscal period for a company ends between the first and fifteenth of a month, then the fiscal month is changed the previous month. For example, if the last day of the fiscal period is April 10th, then the fiscal month is changed to March. If the last day of the fiscal period is April 16th, however, then the fiscal month remains the same. If, as part of this calculation, the fiscal month is January, then the fiscal month and year are changed to the last month of the previous year. Thus, for instance, if the date is Jan. 13, 2001, then the fiscal month and year are changed to December 2000.

Step 2: Realigning the fiscal period into comparable calendar periods using the dates derived in Step 1:

For calculations of values covering a five year period, if the year-end fiscal month for a company ends between July and December, the derived calendar year for that company is equivalent to the fiscal year, otherwise the calendar year is considered to be one year less than the fiscal year.

For calculation of values for quarter, annual, and year to date period, if the month for any fiscal quarter end is January, April, July or October, then the fiscal quarter is changed to the previous calendar quarter. If the month for any fiscal quarter end is other than one of these months, then the month remains the same subject to Step 1 described above. For example, a fiscal quarter ending on February $2^{nd}$ becomes the derived fourth calendar quarter of the prior year (after both Steps 1 and 2 have been executed). In effect, for any given derived calendar quarter, all realigned companies should have at least two fiscal months coinciding with the three months of the derived calendar quarter.

At 1050, the calculations of the fundamental measures based on data accessed or extracted at 1020 are made. These fundamental measures, subject to changes or additions, are listed in Table 1.

TABLE 1

Growth

Sales Growth Rate
Earnings per Share (EPS) Growth Rate
Common Equity per Share Growth Rate
Profitability Return on Equity
Profit Margins
Capital Structure Equity: Assets
Interest Coverage
Cash Flow: Debt Service
Valuation Price: Earnings
Price: Book Thus, once the financial data for particular companies have been through the realignment process as described above, the desired fundamental measures can be calculated using the aligned data. The financially realigned data can be stored and are referred to herein as the "Securities Database." At 1060, the Securities Database containing the values calculated at 1050 are ready to be applied as an input for the Fund System.

For the Fund System, for example as carried out by a conventional computer system, the process begins with a commercially available database at 1070 containing information about the stocks in mutual funds. Examples of these databases are Financial Data Concept's fund stocks and AMG Data Service's fund stocks. The financial data accessed or extracted at 1080 can include a number of data for the portfolio and for the stocks therein. Data for the portfolio could include, for example, the investment objective, the fund type (bond, money market, etc.), net asset values, and the holdings of the fund, etc. For each stock (e.g., holding) in the fund, the data also includes the CUSIP of the stock, the number of shares, price, the market value, etc. In accordance with exemplary embodiments of the present invention, the financial data also can include the financial data for the companies in a particular portfolio as of each of the respective holdings reporting dates for the portfolio that are within an evaluation period (e.g., a list of the companies in the portfolio on each holdings date).

At 1090, weights are determined for all fund stocks with valid base values (e.g., companies that were not excluded by the fiscal realignment process and which have reported both base values at the time of the computer run). Thus, for example, when calculating the quarter-to-quarter growth rate for EPS, if there are no numerical values for both quarters, no weight will be calculated, and the stock will not be included in the portfolio aggregate. With this step, the present invention applies strict time period inclusion to ensure that evaluated companies have valid data for the time period at issue. The weight of each stock is determined by, for example, dividing the value of the stock (with two valid base values) by the sum of the value of all similar stocks (with two valid base values). For example, in a mutual fund, the value of the stock within the mutual fund is the quantity of shares multiplied by the share price. This value is divided by the total market value of all stocks in the mutual fund to obtain each security's weight. The sum of the weights always equals one.

Further, in accordance with an exemplary embodiment of the present invention, the financial measure desired for evaluation, for example the quarter-to-quarter growth rate for EPS in the above example, is calculated based on the holdings of the portfolio as of each holdings date in the evaluation period. Thus, the quarter-to-quarter growth rate for EPS can be calculated using the actual holdings of the portfolio as reported on each holdings date. The aggregate quarter-to-quarter growth rate for EPS is then weighted (if necessary) by the number of months attributable to each reporting date. Another example of this process is described in the Summary section above.

At 1100, the fiscally realigned fundamental measures, e.g., the rates and ratios, for each stock in the fund are extracted from the Securities Database. These measures include the items noted in Table 1 as well as the base values used to calculate the fundamental measures.

At 1110, the Fund System aggregates the fiscally realigned data for all companies in the portfolio, thereby uniquely including all negative base numbers, to calculate weighted averages for the portfolio as described further below.

At 1120, the aggregated data, which can include aggregated data for a number of holdings dates, representing an evaluation of the investment portfolio from the Fund System can be inputted (e.g., stored) into a funds database for subsequent retrieval and use.

As is known in the art, fundamental measures are valid in financial calculations only if both of the base values of the calculated rate/ratio are positive. For example, if the EPS declined from $0.10 to $0.09, the EPS growth rate is −10%;

the base number $0.09 and the base number $0.10 are positive. However, if the EPS declined from $0.10 to −$0.01, the rate is undefined or not meaningful because the base number, −$0.01, is a negative value. This is consistent with the standard practice used in financial analysis which is to exclude rates with negative base numbers.

For many fundamental measures, for a large number of securities, say as many as might be found in a mutual fund, there are likely to be a number of undefined rates and ratios because of negative base values. Without the negative base number inclusion process according to an embodiment of the present invention, these undefined rates/ratios would not be included in any weighted average portfolio aggregate. Excluding securities with such negative financial datum results in a misrepresentation of the portfolio aggregate. By excluding these negative variable inputs, aggregates are incorrectly skewed to positive results. As a result of this conventional practice, rates and ratios designed to foster comparisons are actually misleading investors in these circumstances.

According to an embodiment of the present invention, an alternative calculation for input variables is provided which allows the inclusion of negative values for individual stocks in an investment portfolio. This alternative calculation includes all securities in a portfolio; the portfolio aggregate, therefore, is more inclusive and thus more comparable. If these undefined rates and ratios are to be included in the weighted average aggregate, the negative base number inclusion process must be applied. For example, rather than multiply each stock's weight by the calculated rate/ratio, the weight is first multiplied by the base values separately for all holdings in a portfolio. The weighted base values are then summed. The formula previously applied to the base values is then applied to the two aggregated and weighted totals—creating a portfolio aggregate which includes previously undefined rates/ratios. (This, of course, presumes that neither of the two weighted totals will be negative; if one of the totals is negative, then the aggregate must be recalculated excluding rates/ratios with negative base values.)

In an evaluation period that includes multiple holdings dates, typically results would be provided based on two or more holdings dates for the portfolio. In this case, the aggregated values are calculated and weighted for the respective holdings date relative to the evaluation period as described above. According to an exemplary embodiment of the present invention, if an aggregated base value for the holdings dates is negative, all portfolio totals are excluded from the results.

FIG. 2 illustrates an example of the exemplary method applied to a mutual fund portfolio in which a year to year analysis has been performed on the holdings of the mutual fund. This FIG. 2, for illustrative purposes only, features quarterly statements filed through the first quarter of 2001.

As shown in FIG. 2, the fiscal realignment process has been executed on each stock 2020 using the procedures described above so that only the companies having sufficient fiscal year data are included. For example, if any fiscal year for each company of stock 2020 is less than fifty-two weeks, no data from that company is included in the analysis because all of the fiscal cycles are between fifty to fifty-four weeks, or eleven to thirteen months, in length.

The second step of the fiscal realignment process aligns the fiscal periods for each company of stock 2020. For example, the respective fiscal quarter-end dates for companies are used to align quarterly periods so that the base values cover approximately the same three-month period or at least there are two months in common for the aligned quarters.

The exemplary mutual fund includes stocks: 2020*a*, 2020*b*, to 2020*r*. Associated with each stock 2020 are, for example, fields 2052-2061 containing: value 2052; weight 2053; QTR End 2054 (the date of the most recent quarter); base value$_1$ 2055 (QTR-t for EPS for the fiscally adjusted first quarter of 2000); base value$_2$ 2056 (QTR t-4 for quarterly EPS 1 year before, for the fiscally adjusted first quarter, 2000); growth rate 2057; weight times base value$_1$ 2058 and weight times base value$_2$ 2059. In this case, the fiscally aligned base values are being used to create an aggregate EPS. Any other base values, such as those listed in Table 1, also could be used as desired.

Note that for example, Cisco Systems, Inc. 2020*c*, has a QTR End 2054*c* of Jan. 27, 2001. Under the first realignment process this date is realigned to the fourth quarter of 2000. Thus, base value$_1$ 2055*c* becomes not available, or n/a because only data for the fiscally adjusted first quarter of 2001 will be compared and therefore used in the calculation. This stock 2020*c* is excluded from the aggregate because it does not have base values for both base value$_1$ 2055*c* and base value$_2$ 2056.

The weight 2053 for each stock 2020 is calculated by multiplying the market price by the share quantity for all stocks with valid values for both base value$_1$ 2055 and base value$_2$ 2056 and dividing these products by the total market value of all stocks with base values for both base value$_1$ 2055 and base value$_2$ 2056. The sum of all weights times base value$_1$ 2058 becomes the aggregate numerator 2060; the sum of all weights times base value$_2$ 2059 becomes the aggregate denominator 2062. The portfolio aggregate 2064 is the quotient. In this case the portfolio aggregate 2064 for EPS is −55.4%, that is the weighted average quarterly earnings of all these stocks has declined 55.4% from the first quarter of 2000 to the first quarter of 2001.

Also note that for example, Veritas Software Corp. 2020*j* has negative base values for base value$_1$ 2055*j* and base value$_2$ 2056*j*. Nevertheless, the values are still factored into the aggregate numerator 2060 and the aggregate denominator 2062. Conventional analyses would have excluded Veritas Software Corp. 2020*j*.

In accordance with an exemplary embodiment of the present invention, the analysis of financial data set forth in FIG. 2 can be done for the holdings of the portfolio on each of the holdings dates of the portfolio which occur during the desired evaluation period. Thus, for example, the companies set forth in the FIG. 2 analysis would change for each holdings date to reflect the companies that actually were in the portfolio on the respective holdings date. To the extent that a particular holdings date only accounts for a portion of the desired evaluation period, then the aggregated values calculated for the holdings date would be appropriately weighted and then summed and averaged to account for the entire evaluation period, as noted earlier.

Still referencing FIG. 2, financial rates are typically annual expressions; that is, they represent the rate expressed as a compound annual rate. According to an embodiment of the present invention, quarter versus quarter, year-to-date versus year-to-date and year-to-year rates are calculated by simple division because the time period is a year; rates for periods greater than or less than a year can be based on the equation $P(1+r)^\tau = F$, where
P=the earliest base number
r=the rate of return, compounding annually
$\tau$=the amount of time between the first and second base value, expressed in years
F=the latest base number Financial ratios, such as an equity:assets ratio, refer to a point in time and are calculated by simple division.

Another feature of the fund analyses possible with the present invention is a measure of portfolio stability that can be generated to provide an investor with an indication of the continuity of investment holdings, which serve as the bases for the aggregates in the portfolio. According to an embodiment of the present invention, a stability calculation is made based on: (1) the number or value of the stocks eliminated (e.g., sold) from the investment portfolio and (2) the number or value of new stocks purchased in the portfolio. An example of this calculation applied to a mutual fund is shown in Table 2.

TABLE 2

Mutual Fund, e.g., Putnam New Opportunity - A

| (1) | 189 | stocks with a starting value of | $33,443,626,000.00 | on Dec. 31, 1999 |
| --- | --- | --- | --- | --- |
| (2) | 33 | positions reduced with a value of | $1,362,148,118.16 | on Jun. 30, 2000 |
| (3) | 67 | stocks sold out with a value of | $7,060,969,940.68 | on Dec. 31, 1999 |
| (4) | 100 | total sold or reduced | $8,423,118,058.84 | |
| (5) | 89 | positions increased with a value of | $5,158,208,217.76 | on Jun. 30, 2000 |
| (6) | 56 | new names with a value of | $5,953,638,666.67 | on Jun. 30, 2000 |
| (7) | 145 | total increased or added | $11,111,846,884.43 | |
| (8) | 123 | name changes (sold out & new names) | $13,014,608,607.35 | |
| (9) | 178 | stocks with an ending value of | $36,131,469,000.00 | on Jun. 30, 2000 |

Mutual funds are, for example, required by the Securities and Exchange Commission to report their holdings every six months. The Fund System or the database accessed by the Funds System maintains a historic record of the holdings of mutual funds. Using the most recent holdings records and the previous holdings records for each fund, a stability calculation is made as follows:

Determine the initial number of stocks and their value at a beginning date (line 1).

Determine the number of stocks completely eliminated from the portfolio over, for example, a six month period and the value of the eliminated stocks as of the beginning date (line 3).

Determine the number of new stocks (e.g., new names) added to the portfolio over, for example, the six month period and the value of the new stocks as of the ending date (line 6).

Sum the number of stocks on lines 3 and 6, or sum the values on lines 3 and 6; and note the total(s) on line 8 (in this example the number of stocks completely sold from or newly added to the portfolio were totaled).

Divide the sum on line 8 (either number of issues or value) by its corresponding value (either number of issues or value) on line 1. This value is the stability ratio for the portfolio. A lower value represents a more stable portfolio. To the extent the evaluation period covers more than one holdings date of the portfolio, the values identified in Table 2 can be calculated for each of the holdings dates, weighted appropriately relative to the evaluation period and then aggregated.

The above described portfolio aggregates and stability ratio can be used to compare different portfolios.

Comparisons of portfolios can be, for example, made using the following four-step process:

1. Group the portfolios based on similar investment objectives (e.g., growth, income, etc.). This initial grouping will be used for all aggregates in the following three steps. However, the stability ratio applies to all portfolios regardless of investment objective; hence steps 2 & 3 are performed on the entire population of portfolios, and thus it is not necessary to group the portfolio based on investment objective.

2. Rank portfolios for each aggregated fundamental value and for the stability ratio from highest to lowest 3. Group the ranked portfolios into a frequency distribution (e.g., quartiles, quintiles, deciles, etc.)

4. By selecting one or more aggregated fundamental value(s), to include the stability ratio, investors may assess what funds are in which segments of the combined frequency distributions.

FIGS. 4*a*-4*c* illustrate results of ranking and grouping several thousand equity funds based on, for example, one-year earnings and sales growth of their holdings during 2003 and for which period each of the funds had at least two holdings dates. Using the exemplary principles of the present invention, FIG. 4*a* illustrates calculation of EPS values for funds that qualify for evaluation in 2003 (e.g., all funds that have reported holdings for all of 2003). This includes funds that had at least two different holdings dates that were summed and weighted averaged as previously described. In this case, 2,741 funds had data for 2003 and were evaluated. FIG. 4*a* illustrates quartile rankings after the funds have been ranked from the highest to lowest one-year EPS growth rates.

FIG. 4*b* illustrates quartile rankings based on one year sales growth for funds that qualify for evaluation in 2003 (e.g., all funds that have reported holdings for all of 2003). The fund data included funds that had at least two different holdings dates that were summed and weighted averaged as previously described. In this case, 3,260 funds had data for 2003 and were evaluated for one year sales growth. FIG. 4*b* illustrates quartile rankings of the funds from the highest to lowest one-year sales growth rates.

FIG. 4c combines the analyses of FIGS. 4a and 4b to plot the 2003 funds by quartile. Since FIG. 4c illustrates the intersection of FIGS. 4a and 4b, FIG. 4c charts the 2,741 funds that had data for both EPS and sales growth. For example, in FIG. 4c, quadrant 1 indicates funds with high EPS growth rate and high sales growth, while quadrant 4 indicates low EPS growth rate and low sales growth.

As another example of the valuable applications of the present invention, consider a comparison made between fourteen growth funds. Annual compound growth rates (ACGR) for sales and earnings per share are calculated for the five years ending 2000 using the method according to an embodiment of the present invention; these compound growth rates are shown in Tables 4 and 5 respectively and arranged in quartiles. It should be noted that other fundamental values besides the annual compound growth rates for sales and earnings per share can be used, such as the values identified in Table 1 above.

TABLE 4

Sales from Dec. 31, 1995 to Dec. 31, 2000

|  |  | ACGR % |
|---|---|---|
| Highest Quartile | | |
| 1 | PUTNAM NEW OPPTY; A | 64.8 |
| 2 | PUTNAM VISTA; A | 50.6 |
| 3 | MSDW AMER OPPTYS; A | 31.9 |
| 4 | FIDELITY BLUE CHIP GROW | 24.9 |
| Quartile # 3 | | |
| 5 | PUTNAM INVESTORS; A | 24.9 |
| 6 | CONTRAFUND PORTFOLIO | 24.1 |
| 7 | FIDELITY CONTRAFUND | 23.0 |
| 8 | T ROWE PRICE BL CHIP; ADV | 22.9 |
| Quartile # 2 | | |
| 9 | VANGUARD GROWTH INDX; INS | 21.9 |
| 10 | LEGG MASON VALUE TR; NAV | 21.6 |
| 11 | FIDELITY MAGELLAN FUND | 21.1 |
| Lowest Quartile | | |
| 12 | CREF STOCK ACCOUNT | 21.0 |
| 13 | AIM: VALUE; A | 15.9 |
| 14 | DAVIS NY VENTURE; A | 14.9 |

TABLE 5

EPS from Dec. 31, 1995 to Dec. 31, 2000

|  |  | ACGR % |
|---|---|---|
| Highest Quartile | | |
| 1 | PUTNAM VISTA; A | 50.6 |
| 2 | AIM: VALUE; A | 29.8 |
| 3 | DAVIS NY VENTURE; A | 26.1 |
| 4 | LEGG MASON VALUE TR; NAV | 26.0 |
| Quartile # 3 | | |
| 5 | FIDELITY CONTRAFUND | 25.9 |
| 6 | CONTRAFUND PORTFOLIO | 25.8 |
| 7 | T ROWE PRICE BL CHIP; ADV | 19.8 |
| 8 | FIDELITY MAGELLAN FUND | 18.7 |
| Quartile # 2 | | |
| 9 | MSDW AMER OPPTYS; A | 17.9 |
| 10 | FIDELITY BLUE CHIP GROW | 16.4 |
| 11 | PUTNAM INVESTORS; A | 15.5 |
| Lowest Quartile | | |
| 12 | VANGUARD GROWTH INDX; INS | 15.4 |
| 13 | CREF STOCK ACCOUNT | 12.3 |
| 14 | PUTNAM NEW OPPTY; A | -4.9 |

Once the ACGRs are computed, the fourteen growth funds are ranked from highest to lowest and then divided into a frequency distribution such as quartiles, as described in step 3.

According to an embodiment of the present invention, the portfolios (e.g., funds) can be categorized into four combinations depending on which quartile they belong. For example, possible combinations are: high sales and high earnings; high sales and low earnings; low sales and high earnings; and lows sales and low earnings.

Also according to an embodiment of the present invention, the stability ratios can be calculated for each of the funds. The portfolios can then be ranked from highest to lowest and then divided into quartiles based on their stability ratios. For purposes of this example, the calculation of the stability ratio is not shown for each fund but would be carried out as described above. Combining the stability ratio and the results shown in Tables 4 and 5 yields Table 6, which presents a multivariate analysis of the fourteen mutual funds.

TABLE 6

Sales/EPS ACGR & Last Six Months of Stability

| Growth Funds | 5 Year ACGR % | | STABILITY RATIO | | | | |
|---|---|---|---|---|---|---|---|
| | Sales | EPS | HIGHEST 19-53 | LEVEL 3 58-72 | LEVEL 2 73-96 | LEAST 98-165 | TOTAL |
| High Sales/High Earnings | 30 | 31 | — | 1 | 1 | 2 | 4 |
| High Sales/Low Earnings | 37 | 11 | — | 2 | 1 | 1 | 4 |
| Low Sales/High Earnings | 18 | 25 | 3 | — | 1 | — | 4 |
| Low Sales/Low Earnings | 22 | 14 | 1 | 1 | — | — | 2 |
| Total Number of Funds | | | | | | | 14 |

For example, in Table 6, among the fourteen growth funds, there are four funds that are classified as highest in both sales and earnings growth. In this example, the top two quartiles of Tables 4 and 5 make up what constitutes "high" for sales and earnings respectively. Similarly, "low" sales and growth values are made up of the two lower quartiles. For a fund to be categorized in the "high sales/high earnings" category, it must be in the intersection of high sales and high earnings. For example, the following funds fall into the category of high earnings and high sales simultaneously: Putnam Vista; Contrafund Portfolio; Fidelity Contrafund; and T Rowe Price BI Chip.

On average, the four funds in this category have holdings with sales that grew at an average of thirty percent per annum compound and earnings at an average of thirty-one percent per annum. The stability ratio is divided into four quartiles, or levels, based on their percentage of turnover. In the example shown in Table 6, the stability ratio levels are shown as percentage ranges. For example, if a portfolio has a hundred holdings and during the period of evaluation twenty stocks were added and twenty stocks were sold, then the percentage equals (20+20÷100) which is 0.4 or 40%. One of the four funds is in the upper-middle quartile of stability; one is in the lower-middle quartile of stability; one is in the lowest quartile. Therefore, it can be concluded that the fund in the second quartile of stability (Level 3) (represented by the bolded figure) has the best records for earnings and sales growth—along with some measure of stability in the holdings of the fund.

Figure 3:
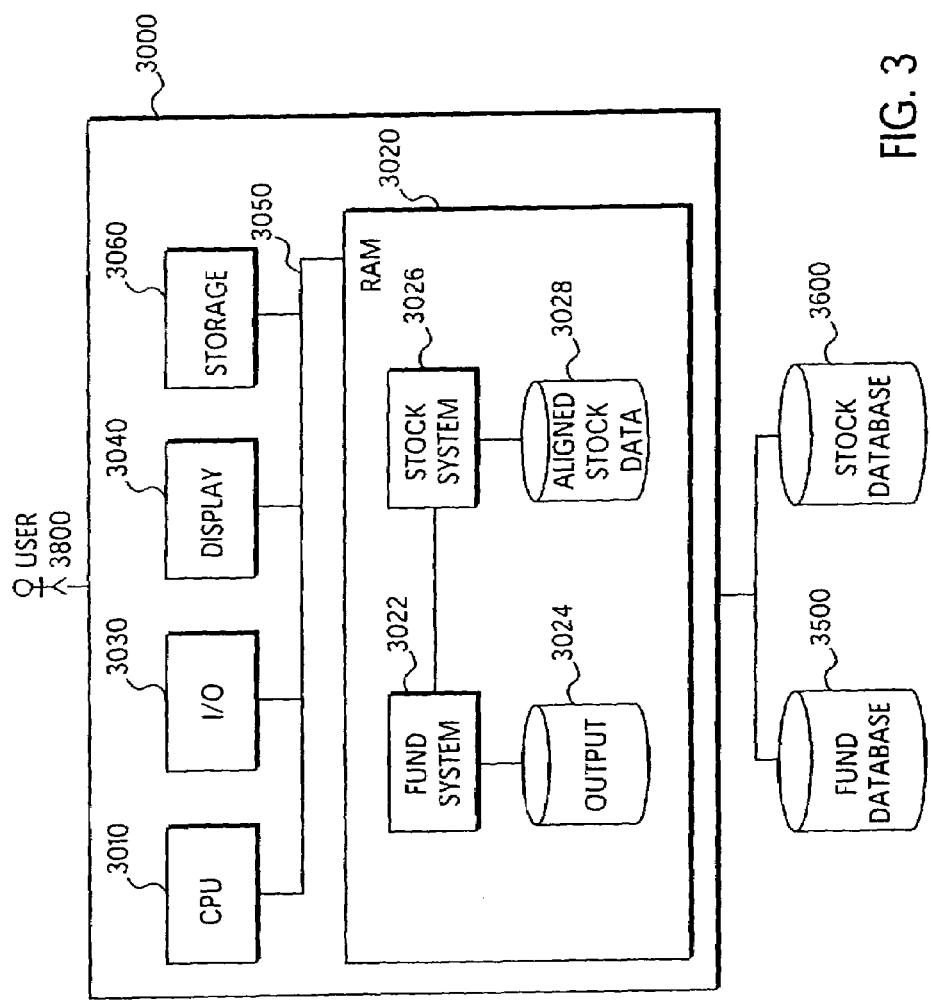
FIG. 3 illustrates a system for evaluating an investment portfolio according to an exemplary embodiment of the present invention.

FIG. 3 illustrates a system for evaluating an investment portfolio according to an exemplary embodiment of the present invention as described above, including comparison of investment portfolios for an evaluation period that includes multiple holdings dates that need to be weighted and aggregated in accordance with aspects of the present invention. The exemplary system includes, for example, a computer system 3000, a fund database 3500 and a stock database 3600. The computer system 3000, could be, for example, a microprocessor based server such as SUN WORKSTATION or WINDOWS NT server or other computer system having suitable processing power and storage. Computer system 3000 includes, for example, a central processing unit 3010, random access memory 3020, input/output device(s) 3030 and display 3040 coupled via a conventional bus 3050. Also coupled to bus 3050 is a storage device 3060 such as a hard disk drive.

Memory 3020 could include, for example, various modules necessary to carry out the method according to an exemplary embodiment of the present invention as described above. Examples of modules stored in memory 3020 are executable software code to implement the functions of a Fund System 3022 and a Stock System 3026. Alternatively, the Fund System 3022 and Stock System 3026 can be implemented in separate computer systems that are suitably connected. The output of Fund System 3022 (e.g., the aggregated portfolio measurement value using fiscally realigned data and negative base number inclusions) can be stored, for example, in an output database 3024. The output of Stock System 3026 is, for example, data that have been processed through the fiscal realignment process and can be stored in aligned stock database 3028 for use by the Fund System 3022.

Fund database 3500 can be, for example, any database that contains fund information, e.g., the holdings of a mutual fund or investment portfolio and the CUSIP numbers for the holdings and is accessed by the Fund System 3022 through a suitable communications link. Likewise, stock database 3600 can be any database that provides the underlying financial data for publicly or privately held companies and is accessed by the Stock System 3026 through a suitable communications link. Both the fund database 3500 and the stock database 3600 can be implemented by commercial content providers of these data as is known in the art.

A user 3800 can, for example, access the computer system 3000 through a dedicated communications link such as T1 or T3 or via a public network such as the Internet. If, for example, the user 3800 would like to compare certain investment portfolios, the user would submit the request to the computer system 3000 by providing the portfolios to be compared and the type of fundamental financial data to be used for the comparison. The computer system 3020 can provide the requested information in real time or have the requested information processed ahead of time and retrieved from a storage device.

Additional advantages and modifications will readily occur to those skilled in the art. Therefore, the present invention in its broader aspects is not limited to the specific details and representative devices shown and described herein. Accordingly, various modifications may be made without departing from the spirit or scope of the general inventive concept as defined by the appended claims.

The invention claimed is:

1. A method for evaluating an investment portfolio comprising the computer implemented steps of:
    accessing data for a plurality of companies in an investment portfolio;
    fiscally realigning the data by converting a fiscal period for each of the plurality of companies into a comparable calendar period, wherein converting each fiscal period includes deriving a calendar-based date for the fiscal period and realigning the data using the calendar-based date;
    calculating at least one predetermined set of values for each company using the fiscally realigned data for more than one holdings date in a predetermined evaluation period;
    aggregating the at least one predetermined set of values for each holdings date to create aggregated values for the investment portfolio over the evaluation period;
    evaluating the investment portfolio as a function of the aggregated values; and
    providing the evaluation to a user.

2. The method according to claim 1, wherein the data includes one of historical financial data and estimated financial data for the plurality of companies.

3. The method according to claim 1, wherein aggregating the at least one predetermined set of values for each holdings date includes weighting the values for each holdings date with respect to the predetermined evaluation period.

4. The method according to claim 3, wherein the weighting includes dividing the number of months between the current holdings date and the previous holdings date by the number of months in the predetermined evaluation period to determine a weighting factor.

5. The method according to claim 1, wherein the predetermined evaluation period includes any of a day, a week, a month, three months, six months, a year, two years and five years.

6. The method according to claim 5, wherein the weighted aggregated values are summed and averaged to determine a performance indicator.

7. The method according to claim 1, wherein the at least one predetermined set of values includes a fundamental financial measure.

8. The method according to claim 7, wherein the fundamental financial measure includes a generally accepted financial measure.

9. The method according to claim 8, wherein the fundamental financial measure includes one of a growth measure, a profitability measure, a capital measure, a valuation measure, a sales growth value, an earnings per share value, a common equity per share value, a return on equity value, a profit margin value, an equity:assets value, an interest coverage value, a cash flow:debt service value, a price earnings value and a price:book value.

10. The method of claim 1, wherein the aggregated values include one of the predetermined set of values having a negative value.

11. The method according to claim 1, wherein the investment portfolio includes a mutual fund, a pension fund or other investment portfolio.

12. The method according to claim 1, wherein each of the plurality of companies is identified by a CUSIP member.

13. A method for evaluating and comparing investment portfolios comprising the computer implemented steps of:
- accessing data for a plurality of companies in at least a first investment portfolio and a second investment portfolio;
- fiscally realigning the data by converting a fiscal period for each of the plurality of companies into a comparable calendar period, wherein converting each fiscal period includes deriving a calendar-based date for the fiscal period and realigning the data using the calendar-based date;
- calculating at least one predetermined set of values for each company in each of the first and second investment portfolios using the fiscally realigned data for more than one holdings date in a predetermined evaluation period;
- aggregating the at least one predetermined set of values for each of the more than one holdings to create aggregated values for each of the first and second investment portfolios over the evaluation period;
- ranking the first and second investment portfolios as a function of the aggregated values for each of the first and second investment portfolios; and
- providing the ranking to a user.

14. The method according to claim 13, including creating at least one performance indicator as a function of the at least one predetermined set of values and wherein said ranking includes ranking the first and second investment portfolios as a function of the at least one performance indicator.

15. The method according to claim 14, wherein the at least one performance indicator includes a plurality of performance indicators and the ranking includes ranking the first and second investment portfolios as a function of the plurality of performance indicators.

16. A method for evaluating and comparing investment portfolios, comprising the computer implemented steps of:
- accessing data for a plurality of companies in a plurality of investment portfolios;
- fiscally realigning the data by converting a fiscal period for each of the plurality of companies into a comparable calendar period, wherein converting each fiscal period includes deriving a calendar-based date for the fiscal period and realigning the data using the calendar-based date;
- calculating a first predetermined set of values and a second predetermined set of values for each company in the investment portfolios using the fiscally realigned data for each holdings date of the investment portfolios in a predetermined evaluation period;
- aggregating the first and second predetermined set of values to create aggregated first values and aggregated second values for the investment portfolios for the evaluation period;
- evaluating the investment portfolios using the aggregated first and second values; and
- providing the evaluation to a user.

17. The method according to claim 16, wherein the first aggregated value is a first financial measure and the second aggregated value is a second financial measure.

18. The method according to claim 17, wherein the first and second financial measure include one of a growth measure, a profitability measure, a capital measure, a valuation measure, a sales growth value, an earnings per share value, a common equity per share value, a return on equity value, a profit margin value, an equity:assets value, an interest coverage value, a cash flow:debt service value, a price earnings value and a price:book value.

19. The method according to claim 16, comprising grouping the investment portfolios into a set of first quartiles based on the first aggregated values and grouping the investment portfolios into a set of second quartiles based on the second aggregated values.

20. The method according to claim 19, wherein the evaluating includes combining the set of first quartile data and the set of second quartile data.

21. A method for evaluating and comparing a set of investment portfolios comprising the computer implemented steps of:
- accessing data for a plurality of companies in each of a set of N investment portfolios;
- fiscally realigning the data by converting a fiscal period for each of the plurality of companies into a comparable calendar period, wherein converting each fiscal period includes deriving a calendar-based date for the fiscal period and realigning the data using the calendar-based date;
- calculating at least one predetermined set of values for each company in each of the N investment portfolios using the fiscally realigned data for more than one holdings date in a predetermined evaluation period;
- aggregating the at least one predetermined set of values for each of the more than one holdings to create aggregated values for each of the N investment portfolios over the evaluation period;
- ranking the N investment portfolios as a function of the aggregated values for each of the N investment portfolios; and
- providing the ranking to a user.

22. The method according to claim 21, including creating at least one performance indicator as a function of the at least one predetermined set of values and wherein said ranking includes ranking the N investment portfolios as a function of the at least one performance indicator.

23. The method according to claim 22, wherein the at least one performance indicator includes a plurality of performance indicators and the ranking includes ranking the N investment portfolios as a function of the plurality of-performance indicators.

* * * * *